Jan. 12, 1937.       L. S. WILLIAMS       2,067,744
WEIGHING AND CLASSIFYING DEVICE
Filed Oct. 25, 1933         4 Sheets-Sheet 1
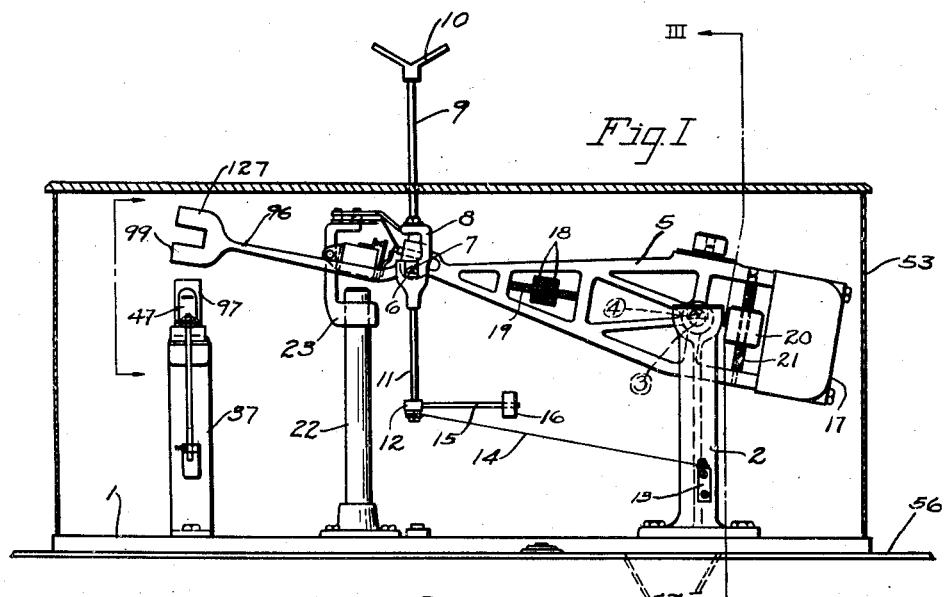
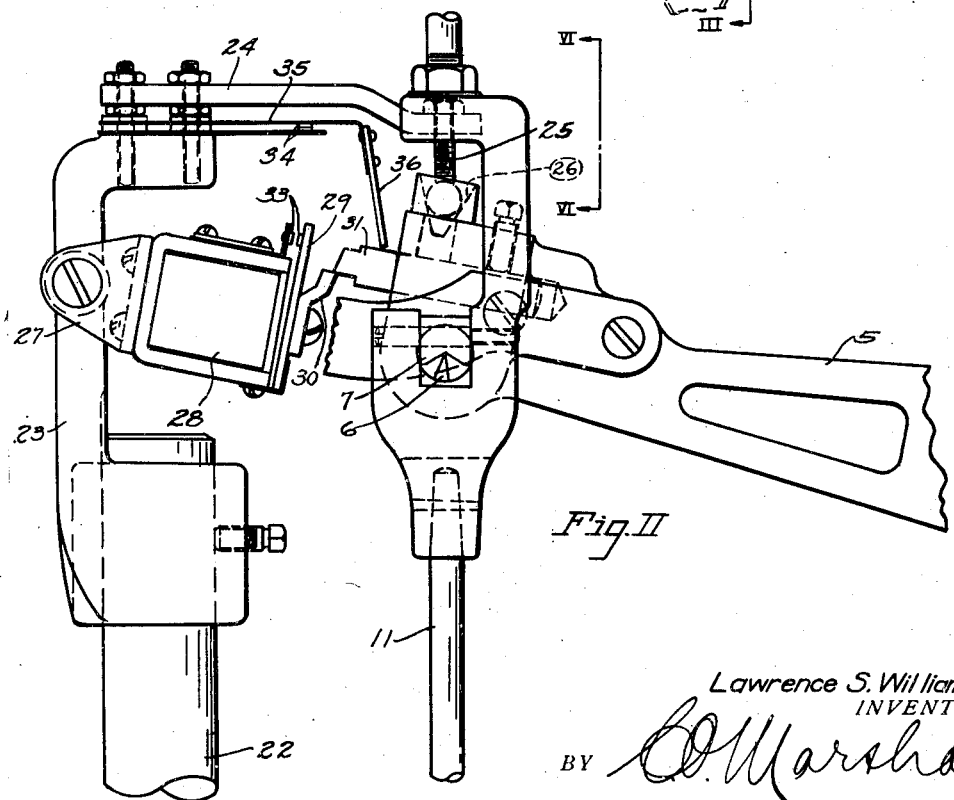
Lawrence S. Williams
INVENTOR
BY  C. D. Marshall
ATTORNEY Jan. 12, 1937.      L. S. WILLIAMS      2,067,744
WEIGHING AND CLASSIFYING DEVICE
Filed Oct. 25, 1933      4 Sheets-Sheet 2
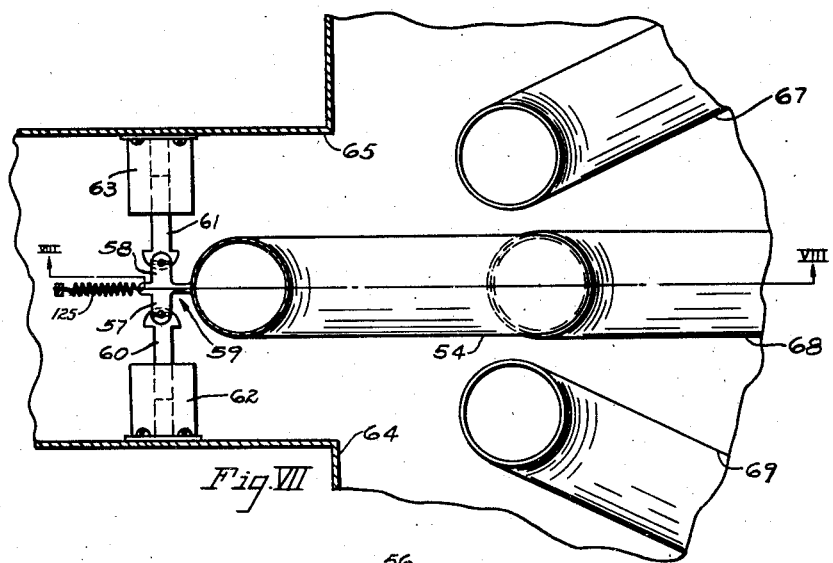
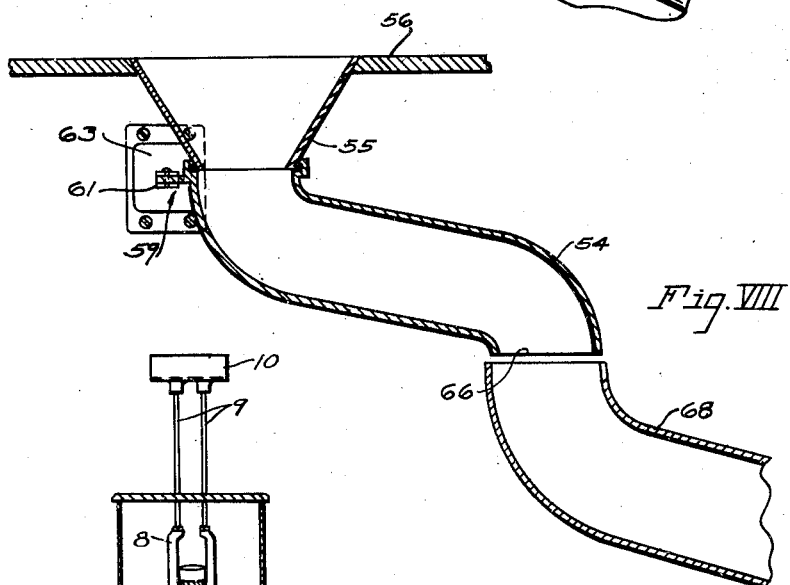
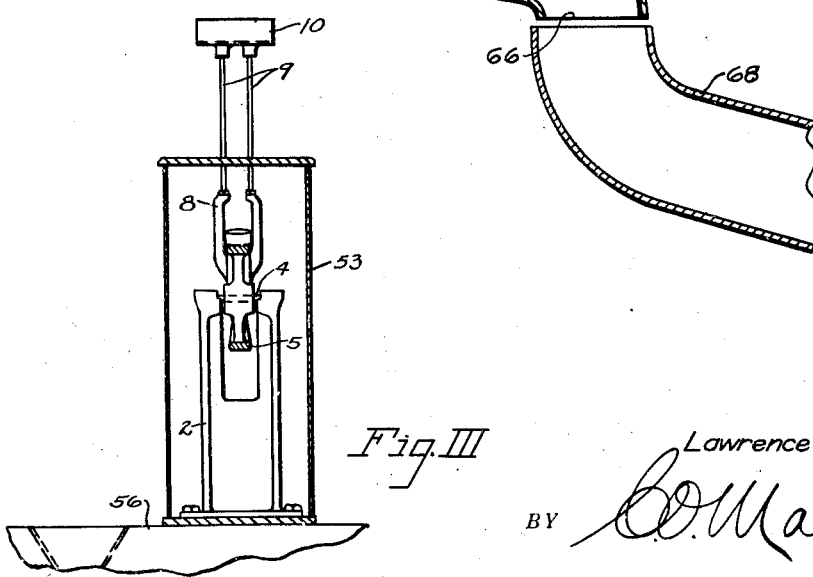
Lawrence S. Williams
INVENTOR
BY C. O. Marshall
ATTORNEY

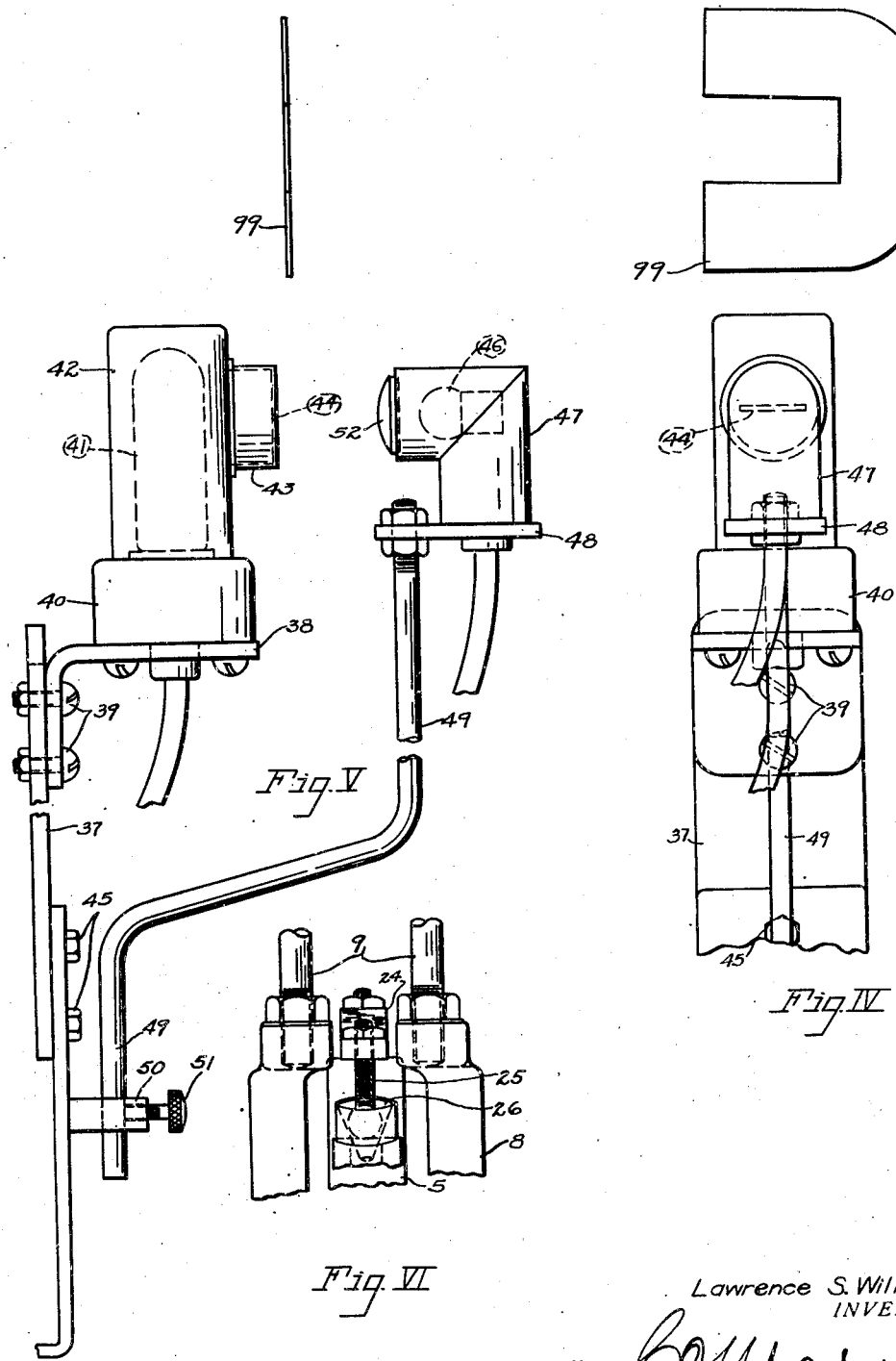

Jan. 12, 1937.  L. S. WILLIAMS  2,067,744
WEIGHING AND CLASSIFYING DEVICE
Filed Oct. 25, 1933   4 Sheets-Sheet 4
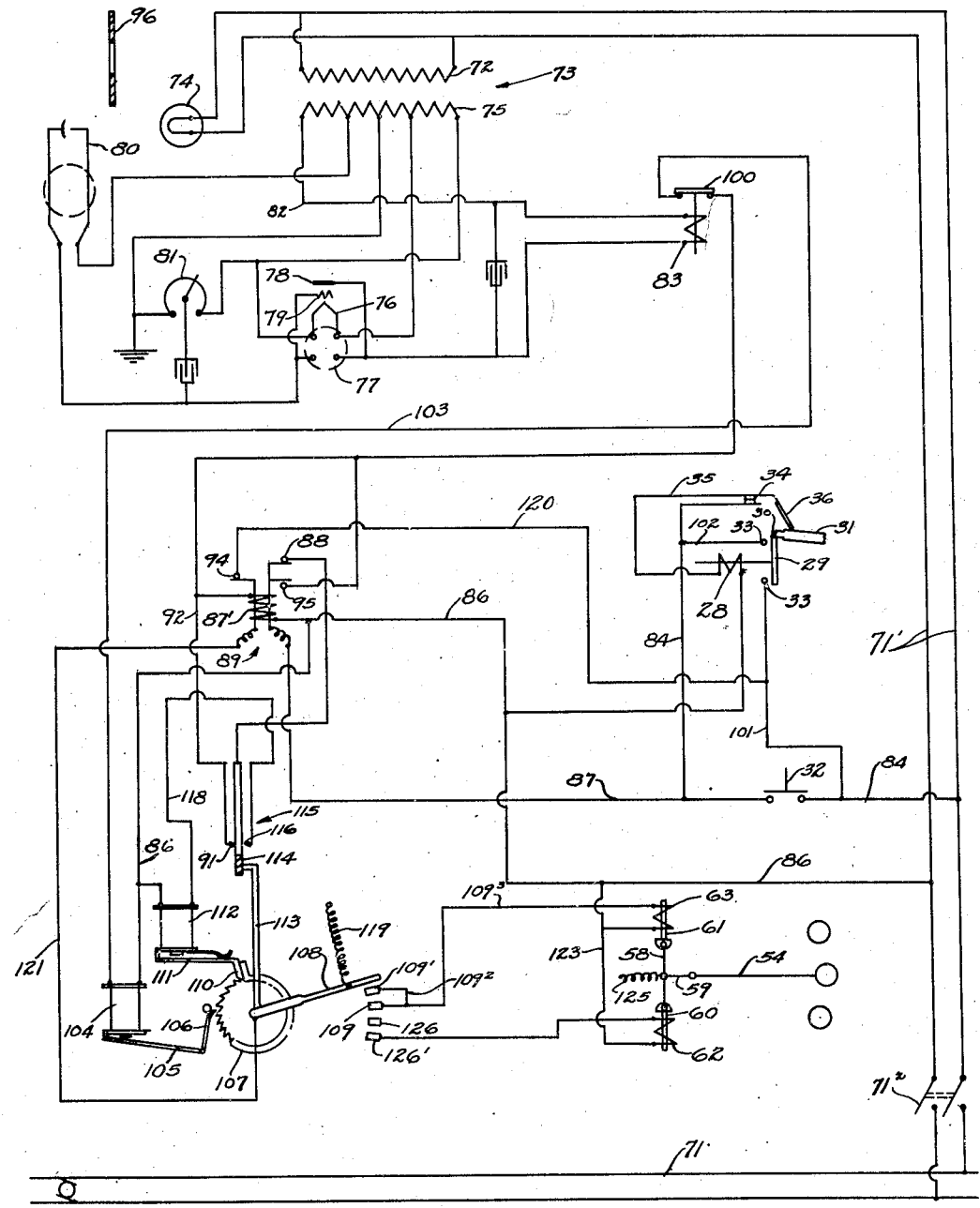
Fig. IX
Lawrence S. Williams
INVENTOR
BY C. D. Marshall
ATTORNEY Patented Jan. 12, 1937

2,067,744

UNITED STATES PATENT OFFICE 2,067,744

WEIGHING AND CLASSIFYING DEVICE

Lawrence S. Williams, Toledo, Ohio, assignor to Toledo Scale Manufacturing Company, Toledo, Ohio, a corporation of New Jersey Application October 25, 1933, Serial No. 695,094

11 Claims. (Cl. 209—121)

This invention relates to weighing and classifying devices and its principal object is the provision of means for determining the weight of articles and classifying such articles with greater speed and accuracy, and is a continuation in part of my co-pending application Serial #650,273.

Another object is the provision of an automatic weighing device capable of determining weight without its movable parts settling to rest.

Another object is the provision of means for determining variations in weights of nearly equal masses with great speed and accuracy.

Another object is the provision of means for determining variations in weights of objects having nearly equal masses and controlling other means for assorting such objects according to their weights.

Still another object is the provision of means for influencing the position of a chute or conduit by means of a photo-electric element controlled by a weighing device.

And a further object is the provision of magnetic means in a device of the class described for automatically assorting articles into three groups according to their true, over or under weight.

These and other objects and advantages will be apparent from the following description in which reference is had to the accompanying drawings illustrating a preferred embodiment of my invention and wherein similar reference numerals designate similar parts throughout the several views.

Referring to the drawings:

Figure I is a side elevational view of the device embodying the invention, the housing being shown in section.

Figure II is an enlarged detailed view showing portions of means for supporting loads to be weighed.

Figure III is a transverse sectional view substantially along the line III—III of Figure I.

Figure IV is an enlarged fragmentary front elevational view of the photo-electric means and a section of the therewith cooperating light eclipsing means.

Figure V is a fragmentary end view of the photo-electric element, the light source and the eclipsing means.

Figure VI is an enlarged fragmentary detailed sectional view taken on the line VI—VI of Figure II.

Figure VII is a fragmentary plan view of the adjustable article chute or conduit and showing portions of the classifying conduits.

Figure VIII is a sectional side elevational view thereof substantially along the line VIII—VIII of Figure VII; and Figure IX is a diagram showing the electrical circuits.

Referring to the drawings in detail, a base 1 of the device supports adjacent one of its ends a fulcrum stand 2 provided with bearings 3 which are engaged by knife edged fulcrum pivots 4 of a swingable frame 5. The swingable frame 5 is so constructed as to possess maximum stiffness with minimum weight and in addition to the fulcrum pivots 4, it is provided with knife edged load pivots 6 which are engaged by bearings 7 mounted on a load spider 8. The load spider 8 is provided with a pair of posts 9 to the upper ends of which is fixed a load receiver 10 and is also provided with a depending stem 11 to the lower end of which is fixed a crosstree 12. Extending from the ends of the crosstree 12 to anchorages on brackets 13, secured to the fulcrum stand 2 is a pair of thin wires 14 preferably made of material not liable to stretch or kink and of a length accurate to the perpendicular distance between the fulcrum and load pivot axes. Arm 15 fixed to the stem 11 and carrying the weight 16 tends to swing the stem in a direction away from the fulcrum stand. The wires 14 are thus kept taut and the horizontal position of the load receiver 10 is maintained.

The weight of the load supporting spider 8 and the members carried thereby as well as the dead weight of the swingable frame to the left of the fulcrum pivot is counterbalanced by counterweight 17 secured to the end of the frame. The position of the center of mass of the swingable assembly to be adjusted in a vertical plane, both longitudinally of the frame 5 (by means of the balance nuts 18 threaded on the longitudinally extending shaft 19) and perpendicularly of the frame 5 (by means of a balance ball 20 threaded on the shaft 21 which extends perpendicularly to the direction of extension of the longitudinal extending shaft 19).

Fixedly mounted on the base 1 adjacent the left end of the swingable frame 5 is an upstanding post 22 having adjustably secured upon its upper end a bracket 23 which in turn supports an arm 24 having a ball-ended screw 25 threaded into its end. When the frame 5 swings into the position in which it is shown in Figure I, the socket 26 in the end of the frame engages over the ball and thus insures exact positioning of the frame, (see Figure II). Adjustably secured to the bracket 23 by means of a clip 27 is an electro magnet 28 having a hingedly mounted armature 29 carrying a detent 30 which when the parts are arranged as shown in Figures I and II engages a flat surface on the under side of a pin 31 that is adjustably fixed to and projects from the free end of the frame 5. The ball ended screw 25 and the detent 30 thus retain the end of the frame 5 against movement in any direction.

For the purpose of energizing the electromagnet 28 to disengage the detent 30 from the pin 31, the magnet is wired into an energizing circuit which includes a normally open push button switch 32. (See Figure IX.) Carried by the armature 29 is one of a pair of contacts 33 which are wired into a sustaining circuit. This circuit also includes a pair of interrupting contacts 34, one of which is located on a flexible finger 35 having a tip 36 made from dielectric material adapted to be lifted by the pin 31 when the frame 5 swings the pin 31 above its position of Figures I and II fastened to the base 1. Adjacent the post 22 is an upwardly extending stand 37 which in the embodiment shown is a sheet metal member to the upper end of which a shelf 38 is secured by the screws 39 for the purpose of supporting a photo-electric element socket 40 which in turn supports in the customary manner a photo-electric element 41 enclosed by a light proof cover 42 having a projecting portion 43 provided with a flat face which has a perforated horizontally disposed narrow slot 44. Reference to Figure V will disclose that the stand 37 is composed of an upper and lower section which are adjustably fastened together by flat headed bolts 45. This insures a height adjustment of the slot 44 the purpose of which will hereinafter become obvious to support a source of illumination for activation of the photo-electric element 41, an electric light 46 is mounted in a light proof case 47 fastened to a shelf 48, secured to the upper end of a leg 49 having a substantially ogee shape, the lower end of which passes through a vertical hole in a boss 50 which extends from the lower portion of the stand 37 and is locked therein by thumb screw 51. It will be seen that the position of the light source may be adjusted with ease so that the greatest amount of light from the lamp 46 passing through the condenser lens 52 and the slot 44 impinges upon the photo sensitive surface of the element 41.

So that the operation of the device be as little influenced by currents of air, dust, etc., I have provided a case 53. The front preferably is hinged so that easy access may be had to the interior and it is also desirable that the front panel contains a sight opening of substantial size, covered by a pane of glass, so that the operator may at all times observe the operation.

Weight determination depends upon the fact that when an article is placed on the platform and the swingable frame 5 is released, the frame assumes the functions of a freely swinging pendulum and the angle through which it swings is proportional to the weight of the article resting thereon. An interceptor 96 attached to the swinging frame is, therefore, in cooperation with the photo-electric element and its activating lamp, well adapted to control auxiliary mechanism, setting up conditions therein which depend upon the weight of the article on the platform.

It is one of the objects of the invention to automatically assort articles into groups according to their weight. The means which are provided to accomplish this comprise a conduit 54 which is swivelly fastened to the bottom of a funnel-like member 55, preferably set flush with the top of a support 56 upon which the device is standing and in close proximity to it. Arms 57 and 58 of a substantially T shaped extension 59 which is a part of the swivelly mounted conduit are engaged by armatures 60 and 61 respectively which are adapted to be actuated by solenoid coils 62 and 63 fastened to depending flanges 64 and 65 of the support, so that when either of the coils 62 and 63 is energized the flux set up therein retracts its armature and its end being hingedly connected to the extension 59 causes this to turn about its rotating axis and to assume a position so that its lower opening 66 rests over the open mouth of one of the fixedly mounted delivery conduits 67, 68, and 69 whose lower openings are positioned over containers into which the articles placed in funnel-like member 55 drop. In the device illustrated and described means for assorting into three groups according to the true weight of the article over and under weight are shown. These means, however, can be augmented so that articles may be assorted into any reasonable number of weight groups, this change may be made by anyone reasonably well versed in the art.

The means for actuating the delivery conduits and the controls comprise essentially an alternating current source 71; wires 71¹ connected thereto convey current to a primary winding 72 of a transformer 73 and to the filament of a light source 74. Taps on the secondary winding 75 of the transformer 73 furnish current of proper potential to a filament 76 of thermionic tube 77, current is also taken from this secondary winding and applied to plate 78 of this thermionic tube as well as to its grid 79. Current is also supplied to this grid from the transformer through photo-electric element 80 and a potentiometer 81. The plate current flowing through wire 82 and passing through relay 83, is adjusted through the bias of the grid 79 by the potentiometer 81, so that a variation in the light incident on the photo-electric element 80 will cause a sufficient change in the plate current to operate the relay 83.

When an article is placed on the platform 10 (assuming that its weight is deficient to such extent that the interceptor fixed to the free end of the swingable frame 5 is not sufficiently deflected to eclipse light), pressure on the push button 32 causes current to flow from the source 71 through wire 84, contact 34, the flexible finger 35, through the coil of relay 28, thence through wire 86 to the other side of the line 71 of current supply. Energization of the relay 28 causes the armature 29 to close and thus maintain the push button circuit. (See Fig. IX.) Current also flows through wire 87, contact 88 of the relay 89, contact 91, wire 92 and coil 87¹ of "make before break" relay 89 and then to the other side of the line through wire 86. When the coil 87¹ of the relay 89 is energized contact 95 thereof is made before the contact 88 however is broken. This maintains the circuit through contacts 88 and 91. Contact 94 of the relay 89 is broken. Energization of relay 28, as hereinbefore stated, retracts its armature 29 thus withdrawing the detent 30 which is fastened thereto, thus releasing the pin 31 which is studded into the end of the swingable frame 5 which now under the influence of the weight of the article on the platform moves downwardly through an angle which is proportionate to the weight of such article.

Since, as previously mentioned the weight of the article, in this example, is not sufficient to deflect the swingable frame 5 so that the interceptor 96 eclipses the light, and the photo-electric element remains activated, contact 100 of the sensing and amplifying circuit relay 83 remains closed since it is controlled by the photo-electric element. Current therefore, flows through wire 103 to coil 104 and then through the wire 86 to the other side of the line to complete this circuit. Energization of coil 104 causes armature 105 to be retracted and a pawl 106 which is freely pivoted thereon engages a tooth on a ratchet sector 107 rotating this so that a wiper arm 108 attached to this ratchet sector 107 will engage a contact 109¹.

For the purpose of holding the wiper arm in this advanced position against the tension of an extensible coil 119 which is attached to the wiper arm 108 and urges it into its zero position, an armature 111 of a magnetic coil 112 is provided with a freely pivoted detent 110 which rests on the toothed periphery of the ratchet sector 107 and which due to the shape of the teeth freely rides thereover when the sector is advancing and then lockingly engages one of the teeth of this sector when released by the pawl 106.

When the swingable frame 5 in its downward movement reaches its lowermost point and starts to return, the operator removes the article from the platform, its upward movement is thereby greatly accelerated. it will pass its zero position and strike the dielectric member 36 raising the flexible finger 35 to which it is attached and thus break the contact 34. This de-energizes the relay 28 and its contact 29 will be opened. The opening of this causes relay 89 to be de-energized and establish a circuit through wire 120, contact 94, wire 121, wiper 108, contact 109¹, wires 109² and 109³ to coil 63 of the delivery actuating solenoid, thence through portions of wires 123 and 86 to the line of current supply.

Energization of coil 63 causes a flux to be set up therein which retracts its armature 61 and this being operatively connected to the delivery conduit 54 causes it to rotate so that its lower open end 66 overlies the fixedly mounted delivery conduit 69 which leads to the receptacle containing light weight articles. When the operator now drops the article into the hopper 55 it will be conveyed by gravity into this receptacle.

It will be seen that blade 114 of the double action switch 115 due to its natural bias engages contact 116 when arm 113, integrally connected to wiper arm 108, moves away. When the next article to be tested is then placed on the platform 10 and the push button 32 pressed, a circuit is established through contact 88 as hereinbefore described, but since the current now flows through the closed contact 116 and wires 118 and 86 to the other side of the line, coil 112 is energized, retracting its armature 111 and withdrawing detent 110 from locking engagement with the teeth of the ratchet sector 107 which now is returned to its zero or home position by the action of extensible coil 119, (as shown in Figure IX) attached to the wiper arm 108. The arm 113 being also fastened to this ratchet sector returns to its initial position and urges the blade 114 to re-energize contact 91 and the energization of relay 89 ensues as hereinbefore described.

In this example we are assuming that the article to be tested is of such weight that castellation 98 of the interceptor 96 is deflected through such an angle as to intercept light emanating from the lamp 46 so that it will not impinge on the photo-electric element 41. When the light is thus intercepted, the resistance of the element increases to such extent that the current passing through the path of the thermionic tube to energize the relay 83, upon deenergization of this coil the contact 100 is broken, the circuit which controls the coil 104 is opened, its armature 105 therefore drops under the influence of gravity and the pawl 106 becomes disengaged from the teeth of the ratchet 107, which is now held in its position only by the detent 110 on the armature 111 of the magnetic coil 112. The swingable frame on which the platform 110 is mounted now starts its upward movement causing the interceptor 96 attached thereto to again permit the light to impinge on the photo-electric element 41. The bias of the grid of the thermionic tube is thus changed to re-energize relay 83 which in turn again closes the contact 100, causing the coil 104 to be energized and the pawl 106 fastened to the armature 105 will engage a tooth and revolve the ratchet sector so that the wiper arm 108 will engage the contact 109 and by the circuit hereinbefore described again energize coil 63, retracting its armature 61 as described in the first example.

Should an article which is of the exact or desired weight be placed on the platform, the interceptor 96 will be deflected to such an extent that the castellation 99 moves below a horizontal plane passing through the slot 44, thus the first impulse imparted by the photo-electric element will cause the wiper arm to engage contact 109¹. A second impulse caused by the castellation passing the slot 49 during the downward movement of the frame 5 will move the wiper arm so that it engages the contact 109 and a third impulse which is imparted when the castellation again permits light to shine on the photo-electric element, after passing the slot in its upward movement, causes the wiper arm 108 to engage contact 126 which is not connected with any of the delivery conduit actuating solenoids so that the action of a spring 125 attached to the movable conduit 54 causes it to overlie the upper opening of the delivery conduit 68 which is adapted to convey articles of predetermined weight into their receptacle.

A fourth impulse occasioned in the manner hereinbefore described, when the article is overweight, will cause the wiper arm 108 to engage the contact 126¹ and through a suitable circuit in the manner shown, energize coil 62 retracting its armature 60 so that the rotatable delivery conduit is caused to the aligned with the upper open end of the fixedly mounted delivery conduit 67 which is adapted to convey the article in the manner previously described into a receptacle designed to receive overweight articles.

It will be seen that the means and mechanism hereinbefore described are fully adapted to fulfill the object primarily stated, it is to be understood, however, that the invention herein illustrated and described is susceptible to variation, modification and change within the spirit and scope of subjoined claims.

Having described my invention, I claim:

1. In a device of the class described, in combination, a device to determine the weight of an article, means for conveying such article to one of a plurality of receptacles, and means in operative relation to said weight determining device to influence the setting of said article conveying device, said influencing means comprising a photo-electric element and a light source to cause light rays to impinge upon said photo-electric element, and means, comprising a member actuated by said weight determining means to intercept such light rays, said light ray intercepting member having a series of intercepting surfaces for successively shading and illuminating said photoelectric element.

2. In a device of the class described, in combination, a device to determine the weight of an article, means for conveying such article selectively to one of a plurality of receptacles, means influenced by said weighing device for selectively actuating a member of said conveying means, said means comprising an impulse actuated progressive switch, and a photo electric element controlled by said weighing device for imparting impulses to said impulse actuated progressive switch.

3. In a device of the class described, in combination, a device to determine the weight of an article, means for conveying such article selectively to one of a plurality of receptacles, means influenced by said weighing device for selectively actuating a member of said conveying means, said means comprising an impulse actuated progressive switch, and a photo electric element controlled by said weighing device for imparting impulses to said impulse actuated progressive switch, and said conveying means including a plurality of magnets adapted to be selectively energized by said impulse actuated progressive switch.

4. In a device of the class described, in combination, pendulous means, means whereby a load may be applied to said pendulous means releasable means for holding said pendulous means with its center of mass at one side of a vertical plane passing through its fulcrum axis, a light source mounted on one side of the vertical plane of movement of said pendulous mass auxiliary mechanism, a photo-electric element mounted on the other side of such vertical plane of movement, an electrical circuit connecting said photo-electric element and said auxiliary mechanism, and a portion of said pendulous means having a castellated periphery for successively intercepting light from said light source whereby electrical impulses are imparted to said electrical circuit.

5. In a device of the class described, in combination, pendulous means, means whereby a load may be applied to said pendulous means releasable means for holding said pendulous means with its center of mass at one side of a vertical plane passing through its fulcrum axis, a light source mounted on one side of the vertical plane of movement of said pendulous mass auxiliary mechanism, a photo-electric element mounted on the other side of such vertical plane of movement, an electrical circuit connecting said photo-electric element and said auxiliary mechanism, and a portion of said pendulous means having a castellated periphery for successively intercepting light from said light source whereby electrical impulses are imparted to said electrical circuit, said electrical circuit including an impulse progressive switch adapted to be actuated by such impulses imparted by said photo-electric member.

6. In a device of the class described, in combination, pendulous means, means whereby a load may be applied to said pendulous means releasable means for holding said pendulous means with its center of mass at one side of a vertical plane passing through its fulcrum axis, a light source mounted on one side of the vertical plane of movement of said pendulous mass auxiliary mechanism, a photo-electric element mounted on the other side of such vertical plane of movement, an electrical circuit connecting said photo-electric element and said auxiliary mechanism and a portion of said pendulous means having a castellated periphery for successively intercepting light from said light source whereby electrical impulses are imparted to said electrical circuit, said electrical circuit including an impulse progressive switch adapted to be actuated by such impulses imparted by said photo-electric member, said auxiliary mechanism comprising more than one stationary conduit and a conduit mounted for rotation having one end adapted to register selectively with one of the ends of said stationary conduits.

7. In a device of the class described, in combination, a device adapted to determine the weight of an article by the amplitude of the first swing of a pendulous member, auxiliary means adapted to be positioned in accordance with the weight of such article, electrical means for actuating said auxiliary means, said electrical means comprising a light source, a circuit, a photo-electric element, an impulse switch having a series of contacts, said auxiliary means having a series of magnets, adapted to be successively energized, electrically connected to said contacts of said impulse switch and a member having a castellated periphery connected to said pendulous member to cooperate with said light source and said photoelectrical element to cause one or more impulses to be imparted to said electrical circuit to energize selectively said contacts and said magnets of said auxiliary means.

8. In a device of the class described, in combination, a stationary support, a pendulous member pivotally mounted on said support, means supported by said pendulous member at one side of its axis of movement for receiving an article, means for holding said pendulous member and article stationary in definite position with their combined center of mass at one side of a vertical plane passing through the axis of movement of said pendulous member, the definite position in which said pendulous member is held always being the same position, means for releasing said holding means, said pendulous member upon release being swingable by gravity to the other side of such vertical plane, the extent of such swing being dependent upon the weight of such article, means for conveying such article selectively to one of a plurality of locations, and means receiving varying impulses responsive to the degree of movement of said pendulous member upon release of said holding means for selectively actuating said conveying means.

9. In a device of the class described, in combination, a pendulous member, means supported by said pendulous member at one side of its axis of movement for receiving an article, means for holding said pendulous member and article in definite positions with their combined center of mass at one side of a vertical plane passing through the axis of movement of said pendulous member, means for releasing said holding means, means for conveying such article selectively to one of a plurality of locations, and means influenced by the extent of the first swing of said pendulous member upon release of said holding means for selectively actuating said conveying means, said means including an impulse-actuated switch and a photoelectric element for imparting impulses thereto.

10. In a device of the class described, in combination, a pendulous member, means supported by said pendulous member at one side of its axis of movement for receiving an article, means for holding said pendulous member and article with their combined center of mass at one side of a vertical plane passing through the axis of movement of said pendulous member, means for releasing said holding means, means for conveying such article selectively to one of a plurality of locations, and means influenced by the extent of the first swing of said pendulous member upon release of said holding means for selectively actuating said conveying means, said means including a photoelectric element, a light source, a plate having a series of intercepting surfaces to be moved across the path of light from said source to said photoelectric element, and means whereby said plate is moved by movement of said pendulous member.

11. In a device of the class described, in combination, a pendulous member, means supported by said pendulous member at one side of its axis of movement for receiving an article, means for holding said pendulous member and article with their combined center of mass at one side of a vertical plane passing through the axis of movement of said pendulous member, means for releasing said holding means, means for conveying such article selectively to one of a plurality of locations, and means influenced by the extent of the first swing of said pendulous member upon release of said holding means for selectively actuating said conveying means, said means including a photoelectric element, a light source, a plate having a series of intercepting surfaces to be moved across the path of light from said source to said photoelectric element, means whereby said plate is moved by movement of said pendulous member, and an impulse switch and electric circuit connecting said photoelectric element to said impulse switch.

LAWRENCE S. WILLIAMS.